US010220675B1

(12) United States Patent
Reed

(10) Patent No.: US 10,220,675 B1
(45) Date of Patent: Mar. 5, 2019

(54) VEHICLE WINDSHIELD DEFROSTING CONTROL BASED ON FROZEN PRECIPITATION ACCUMULATION

(71) Applicant: Toyota Motor Engineering & Manufacturing North America, Inc., Erlanger, KY (US)

(72) Inventor: Frankie B. Reed, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/690,845

(22) Filed: Aug. 30, 2017

(51) Int. Cl.
*B60H 1/00* (2006.01)

(52) U.S. Cl.
CPC ..... *B60H 1/00785* (2013.01); *B60H 1/00792* (2013.01); *B60H 1/00814* (2013.01)

(58) Field of Classification Search
CPC ............ B60H 1/00785; B60H 1/00792; B60H 1/00814
USPC ........................................................ 165/204
See application file for complete search history.

(56) References Cited

U.S. PATENT DOCUMENTS

| 5,801,307 | A | 9/1998 | Netzer | |
|---|---|---|---|---|
| 6,262,410 | B1 * | 7/2001 | Stam | B60S 1/0822 250/208.1 |
| 6,853,897 | B2 * | 2/2005 | Stam | B60Q 1/143 250/208.1 |
| 7,016,045 | B2 * | 3/2006 | Kwon | G01N 21/538 356/437 |
| 7,310,190 | B2 * | 12/2007 | Fox | G01N 21/15 359/618 |
| 2018/0244129 | A1 * | 8/2018 | Whitens | B60H 1/00742 |

\* cited by examiner

*Primary Examiner* — Jianying Atkisson
*Assistant Examiner* — Joel Attey
(74) *Attorney, Agent, or Firm* — Christopher G. Darrow; Darrow Mustafa PC

(57) ABSTRACT

A device and method for mitigating freezing-precipitation accumulation for a vehicle window are described. The device and method include retrieving ambient temperature data. When the ambient temperature data exceeds a temperature threshold for freezing precipitation, sensing ambient light from within a vehicle cabin to produce light magnitude sample data and comparing the light magnitude sample data with a baseline light magnitude sample data from within the vehicle cabin. When the light magnitude sample data compares unfavorably with the baseline light magnitude sample data, generating a vehicle window defroster command for transmission to activate a vehicle window defroster operable to be powered by a vehicle battery source.

17 Claims, 4 Drawing Sheets

VEHICLE WINDSHIELD DEFROSTING CONTROL BASED ON FROZEN PRECIPITATION ACCUMULATION

FIELD

The subject matter described herein relates in general to vehicle windshield defrosting devices and, more particularly, to the control of vehicle windshield defrosting devices in electric vehicles and/or petroleum-electric hybrid vehicles based on freezing-precipitation accumulation on the vehicle windshield.

BACKGROUND

Generally, modern automotive vehicles include, and are expected to include, interior comfort control systems. Such systems include a heating, venting, air conditioning (HVAC) system that allows a user to select a desired interior temperature of the vehicle. However, such systems do not effectively reduce freezing-precipitation from a vehicle windshield. Because of the limited available charge of an electric vehicle or a petroleum-electric hybrid vehicle, as well as lacking a heat product such as conventional petroleum based vehicles, electric heaters are called upon to generate a suitable comfort level as well as defrost a windshield of freezing-precipitation. Moreover, having all comfort controls in operation at the same time to warm and defrost an electric or hybrid vehicle unnecessarily replenishes the vehicle battery charge, and may cause the vehicle to not be drivable until sufficiently re-charged. Moreover, even when the electric or hybrid vehicle may be tethered to a charging station, the drain of the electric heaters prolong the charging period for the vehicle until the desired charge and driving range is reached.

SUMMARY

A device and methods for mitigating freezing-precipitation accumulation for a vehicle window are disclosed.

In one implementation, a method for mitigating freezing-precipitation accumulation for a vehicle window is disclosed. The method includes retrieving ambient temperature data. When the ambient temperature data exceeds a temperature threshold for freezing precipitation, sensing ambient light from within a vehicle cabin to produce light magnitude sample data and comparing the light magnitude sample data with a baseline light magnitude sample data from within the vehicle cabin. When the light magnitude sample data compares unfavorably with the baseline light magnitude sample data, generating a vehicle window defroster command for transmission to activate a vehicle window defroster operable to be powered by a vehicle battery source.

In another implementation, a vehicle control unit is disclosed. The vehicle control unit includes a communication interface, a processor, and memory. The communication interface to service communication with a vehicle network. The processor is processor communicably coupled to the communication interface and a plurality of sensor devices. The memory is communicably coupled to the processor and stores a sensor monitoring module, and an accumulation assessment module. The sensor monitoring module includes instructions that, when executed by the processor, cause the processor to receive ambient vehicle temperature data, and compare the ambient vehicle temperature data with a temperature threshold for freezing precipitation. When the ambient vehicle temperature data exceeds the temperature threshold for freezing precipitation, the sensor monitoring module includes instructions that, when executed by the processor, cause the processor to receive light magnitude sample data from a sensor device operable to sense ambient light from within a vehicle cabin. The accumulation assessment module includes instructions that, when executed by the processor, cause the processor to compare the light magnitude sample data with a baseline light magnitude sample data from within the vehicle cabin. When the light magnitude sample data compares unfavorably with the baseline light magnitude sample data, the accumulation assessment module includes instructions that, when executed by the processor, cause the processor to generate a vehicle window defroster command for transmission to activate a vehicle window defroster operable to be powered by a vehicle battery source to mitigate a freezing-precipitation accumulation of a vehicle window span.

BRIEF DESCRIPTION OF THE DRAWINGS

The description makes reference to the accompanying drawings wherein like reference numerals refer to like parts throughout the several views, and wherein.

DETAILED DESCRIPTION

A method and device for mitigating freezing-precipitation accumulation of a vehicle window for an electric and/or a petroleum-electric hybrid vehicle is described herein. In one example method, ambient temperature data may be received, and when the ambient exceeds a temperature threshold for freezing precipitation, such as thirty-two degrees Fahrenheit or zero-degrees Celsius, ambient light may be sensed from within a vehicle cabin to produce light magnitude sample data. As may be appreciated, as freezing precipitation may accumulate on vehicle windows, the index of refraction as relating to the window changes, affecting the lighting within the vehicle.

The light magnitude sample data may be compared with a baseline light magnitude sample data from within the vehicle cabin. The baseline light magnitude sample data may be sampled upon a point in time (such as when the vehicle may be parked), periodically (such as over predetermined intervals), and/or with respect to data samples developed under varying time and/or date conditions under varying cold-season conditions.

When the light magnitude sample data compares unfavorably with the baseline light magnitude sample data (that is, an indication that the lighting conditions within the vehicle may indicate a layer of freezing precipitation covering a vehicle window span, a vehicle window defroster command is generated for transmission to activate a vehicle window defroster operable to be powered by a vehicle battery source.

Figure 1:
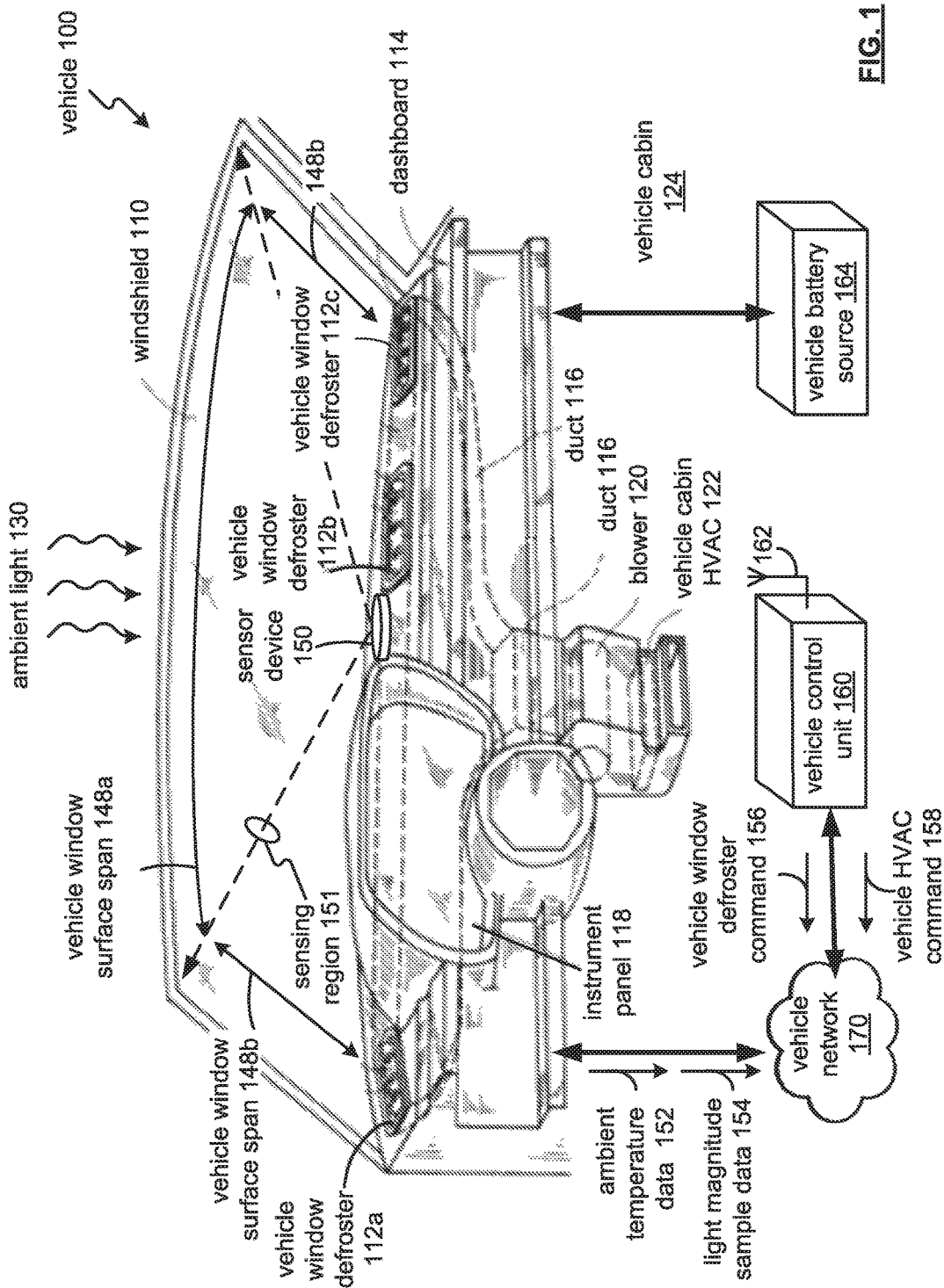
FIG. 1 is an illustration of a vehicle interior including a vehicle control unit powered by a vehicle battery source 164.

FIG. 1 is an illustration of a vehicle 100 including a vehicle control unit 160 communicatively coupled with an antenna 162, powered by a vehicle battery source 164. As may be appreciated, the vehicle 100 may be an electric vehicle (EV) or petroleum-electric hybrid vehicle (PHV), such as an automobile, light truck, cargo transport, or any other passenger or non-passenger vehicle.

The vehicle 100 may include a dashboard 114 positioned towards a front most portion of a vehicle cabin 124. The dashboard 114 extends in the lateral direction between the sides of the vehicle 100. A top surface of the dashboard 114 is located under a windshield 110. The top surface of the dashboard 114 may include a plurality of vehicle window defrosters 112. Each of the vehicle window defrosters may be individually controlled so that one or all may operate to defrost windshield 110 upon the presence of freezing-precipitation accumulations.

An instrument panel 118 may be positioned for viewing by a vehicle operator. A duct 116, a blower 120, and a vehicle cabin HVAC 122 may be arranged within the dashboard 114. Duct 116 operates to convey heated air from the vehicle cabin HVAC 122 to the windshield 110.

Sensor device 150 may operate to sense ambient light 130 passing through the windshield 110 into the vehicle cabin 124. The intensity of the ambient light reaching the vehicle cabin 124 relates to a refractive index of the windshield, which correlates with the amount of freezing-precipitation that may accumulate on the windshield 110. Examples of sensor device 150 may include a sunload sensor, a camera sensor, etc.

A sunload sensor may operate to sense the intensity of the ambient light 130. Generally, a sunload sensor may be used to adjust the vehicle cabin HVAC 122 for occupant comfort in either warm-season or cold-season weather conditions; however, in cold-season weather, the vehicle range for electric vehicles and/or petroleum-electric hybrid vehicles diminishes due to additional energy demands of the vehicle cabin HVAC 122.

Unlike petroleum-based vehicles, electric vehicles (as well as petroleum-electric hybrid vehicles at low-speed) may generate little, if any, heat, while conventional vehicles produce sufficient heat for warming the vehicle cabin 124. Also, the vehicle range can be further diminished due to cold ambient temperatures. For example, a vehicle 100 with a usual range of eighty-four miles on a battery charge may have depleted the vehicle power source 164 after driving for only thirty-six miles in cold-season weather (for example, when the thermometer dips to twenty-degrees). In one example to mitigate the effect of cold temperatures on a vehicle power source 164, the vehicle 100 may warm the vehicle power source 164 with forced-air heating when tethered to the power grid.

Also, discharging at least a portion of the charge of the vehicle power source 164 while also tethered to the power grid may extend the time needed for charging the electric vehicle and/or petroleum-electric hybrid vehicle for travel. For example, tethering the vehicle 100 to a household power outlet corresponds to 4.5 miles of range per hour of charging, or about 22 hours for a full charge for a vehicle having a one-hundred mile range. When the charge is provided for other vehicle functions, the charging period increases, which may cause the vehicle 100 to be available for the operator when desired.

Generally, in cold-season weather, an electric-vehicle range declines due to the additional energy demand from the heating system. Electric vehicles generate little heat as opposed to conventional petroleum-based vehicles, which produce more than enough engine heat to heat the vehicle cabin 124.

For occupant comfort, an additional electric heater is needed for the vehicle cabin HVAC 122. The electric heater may draw power from the vehicle battery source 164 that also powers the engine of the vehicle 100. In effect, because the fuel supply for the vehicle 100 is used on non-engine uses, an effective range of the vehicle may be reduced by half than in mild-season conditions.

When a vehicle 100 may be under a charging condition, the supply may be capable of supplying charge to the vehicle battery source 164 while heating vehicle cabin 124 with the vehicle cabin HVAC 122.

The sensor device 150 may operate to determine whether vehicle battery source 164 may be used for operation of the vehicle window defrosters 112 (such as for mitigating freezing-precipitation accumulations on windshield 110), or for operation of the vehicle cabin HVAC 122.

The sensor device 150 may include one element or a plurality of elements in an array configuration for greater sensitivity to changes in the refraction index of the windshield 110 as may occur with freezing-precipitation accumulation(s).

The sensor device 150 may operate for a sensing region 151 that may include a horizontal vehicle window surface span 148*a* and a vertical vehicle window surface span 148*b*. The area of the sensing region 151 may be sized sufficient to promote ready viewing for operation of the vehicle 100.

Generally, the sensor device 150 may operate to sense a refractive index value as relating to the windshield 110. When ambient temperature data 152 exceeds a temperature threshold for freezing precipitation (that is, at or below thirty-two degrees Fahrenheit or zero degrees Celsius, generally), the sensor device 150 may operate to sense the degree to which freezing precipitation (such as snow, freezing rain, freezing fog, ice, etc.) may accumulate on the windshield 110, and affects a refractive index for the windshield 110. Based upon light magnitude sample data 154 (such as light intensity and/or object recognition) produced by the sensor device 150 and transmitted to the vehicle control unit 160 via a vehicle network 170, the vehicle control unit 160 may operate to determine whether one or all of the vehicle window defrosters 112*a*, 112*b* and 112*c*, or the vehicle cabin HVAC 122 may suffice to mitigate freezing-precipitation accumulation on the windshield 110. Based upon the light magnitude sample data 154, the vehicle control unit may generate a vehicle window defroster command 156 and/or a vehicle HVAC command 158 to optimize a charge of the vehicle battery source 164 in relation to mitigating freezing-precipitation accumulation, as is discussed in detail with reference to FIGS. 2-4.

The antenna 162, communicatively coupled with the vehicle control unit 160, may include one or more conductive elements that interact with electromagnetic signals transmitted by remote vehicle actuators, such as a key fob, automatic start schedules scheduled via handheld mobile device applications, or learned by the vehicle such as a commuting routine, etc., as is discussed in detail with reference to FIGS. 2-4.

Figure 2:
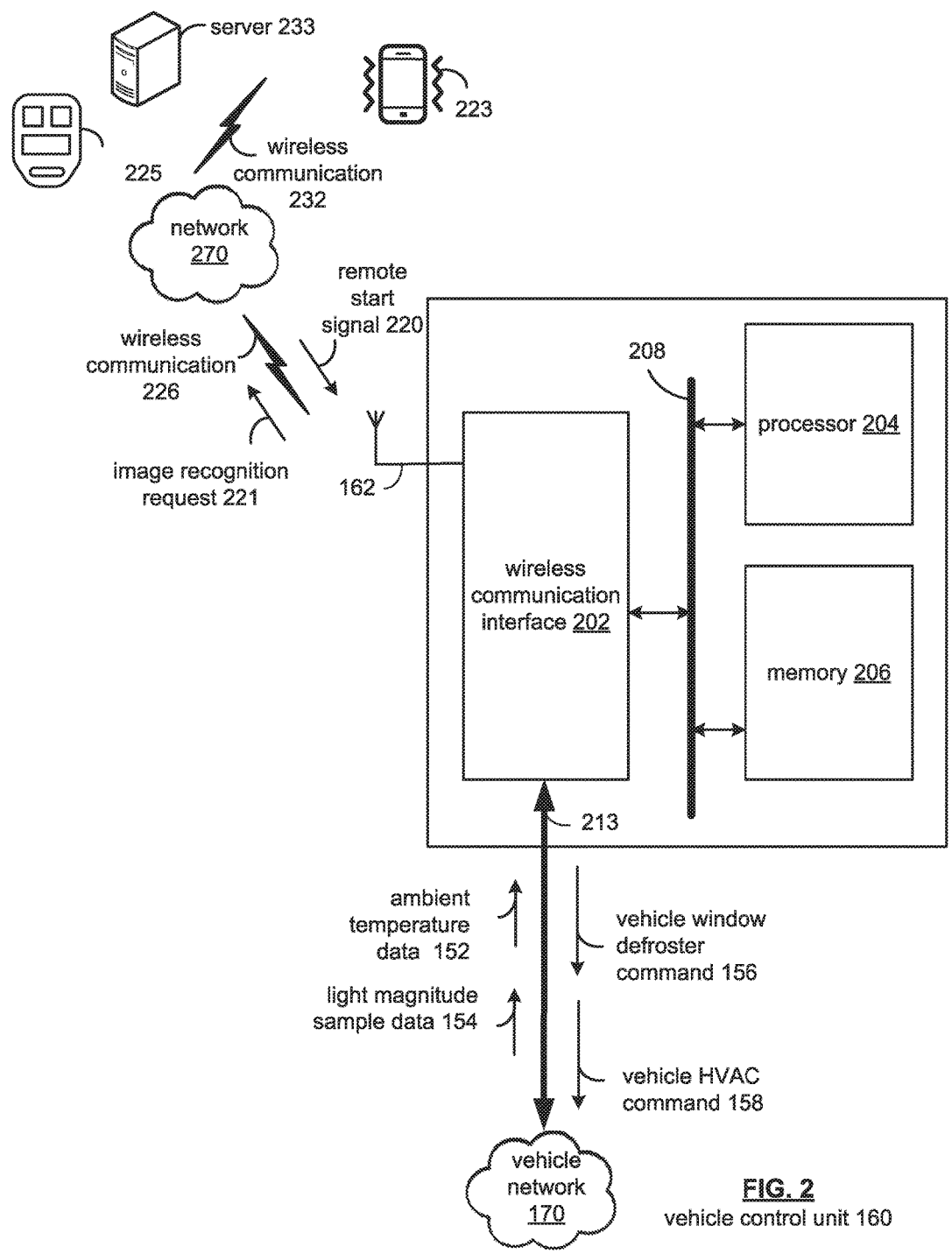
FIG. 2 illustrates a block diagram of a vehicle control unit of FIG. 1.

FIG. 2 illustrates a block diagram of a vehicle control unit 160 of FIG. 1. The vehicle control unit 160 may include a wireless communication interface 202, a processor 204, and memory 206 that are communicably coupled via a bus 208. The vehicle control unit 160 may provide an example platform for the device and methods described in detail with reference to FIGS. 1-4.

The processor 204 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory (and/or memory element) 206 may be communicably coupled to the processor 204, and may operate to store one or more modules described herein. The modules can include instructions that, when executed, cause the processor 204 to implement one or more of the various processes and/or operations described herein.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. Furthermore, arrangements described herein may take the form of a computer program product embodied in one or more computer-readable storage medium having computer-readable program code embodied, e.g., stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device. Program code embodied on a computer-readable medium may be transmitted using any appropriate medium, including but not limited to wireless, wireline, optical fiber, cable, RF, etc., or any suitable combination of the foregoing.

The memory 206 is capable of storing machine readable instructions, such that the machine readable instructions can be accessed and/or executed by the processor 204. The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP) such as JAVA, Smalltalk, C++ or the like, conventional procedural programming languages, scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wireline and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry.

Still further note that, the memory 206 stores, and the processor 204 executes, hard coded and/or operational instructions of modules corresponding to at least some of the steps and/or functions illustrated in FIGS. 1-4.

The vehicle control unit 160 can include one or more modules, at least some of which are described herein. The modules may be considered as functional blocks that can be implemented in hardware, software, firmware and/or computer-readable program code that perform one or more functions. A module, when executed by a processor 204, implements one or more of the various processes described herein. One or more of the modules can be a component of the processor(s) 204, or one or more of the modules can be executed on and/or distributed among other processing systems to which the processor(s) 204 is operatively connected. The modules can include instructions (e.g., program logic) executable by one or more processor(s) 204.

The wireless communication interface 202 generally governs and manages the data received via a vehicle network 170. There is no restriction on the present disclosure operating on any particular hardware arrangement and therefore the basic features herein may be substituted, removed, added to, or otherwise modified for improved hardware and/or firmware arrangements as they may develop.

The antenna 162 may include one or more conductive elements that interact with electromagnetic signals transmitted by global positioning system satellites. The received signals may be transformed into a data signal indicative of operational commands (for example, remote start, security alarm, etc). The antenna 162 operates to provide communications with the vehicle control unit 160 through wireless communication 226.

Wireless communication 226 may operate to convey a remote start signal 220 (such as via a key fob 225, a handheld mobile device 223, etc.). As may be appreciated, wireless communication 232 and network 270 may operate to convey the remote start signal 220, as well as provide access by the vehicle control unit 110 to a server 233, which may be communicatively coupled to the network cloud 270 via wireless communication 232.

The server 233 may include third party servers that are associated with applications that are running and/or executed by the vehicle control unit 160, etc. For example, the server 233 may include cloud computing services accessible via application program interfaces executed by the vehicle control unit, as well as thin client services. In this respect, processing may be performed remotely or locally for desired functionality, such as image recognition processing based on an image recognition request 221 by the vehicle control unit 160 when the sensor device 150 may include a camera device for generating sensor data for light magnitude sample data 154.

In response to receiving the remote start signal 220, the vehicle control unit 160 may operate to retrieve an ambient vehicle temperature data 152. When the ambient temperature data exceeds a temperature threshold for freezing precipitation (that is, at or below the freezing temperature for water), the vehicle control unit 160 may operate to sense ambient light from within a vehicle cabin to produce light magnitude sample data 154, and compare the light magnitude sample data 154 with a baseline light magnitude sample data. When the light magnitude sample data 154 compares unfavorably with the baseline light magnitude sample data, indicating a change or affect to a windshield's refractive index, the vehicle control unit 160 may generate an electric-vehicle window defroster command 156 for transmission to activate an electric-vehicle window defroster 112a, 112b and/or 112c (FIG. 1) operable to be powered by a vehicle battery source 164 (FIG. 1).

In the instance when light magnitude sample data 154 compares favorably with a baseline light magnitude data sample, indicating that the refractive index of a windshield is substantially unchanged (that is, little to no freezing-precipitation accumulation), the vehicle control unit may generate a vehicle HVAC command 158 for transmission to activate a vehicle cabin HVAC 122 (FIG. 1) operable to be powered by a vehicle battery source 164 (FIG. 1).

The wireless communication 226 and 232 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

As may be appreciated, the communication path 213 of the vehicle network 170 may be formed from a medium suitable for transmitting a signal such as, for example, conductive wires, conductive traces, optical waveguides, or the like. Moreover, the communication path 213 can be formed from a combination of mediums capable of transmitting signals, and may include a combination of conductive traces, conductive wires, connectors, and buses that cooperate to permit the transmission of electrical data signals to components such as processors, memories, sensors, input devices, output devices, and communication devices.

Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The term "signal" may be understood to relate to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

Respective modules of the vehicle control unit 160, and associated instructions, when executed by the processor 204, promote the method and devices relating to mitigating freezing precipitation accumulation for a vehicle window, as is discussed in reference to FIGS. 1-4.

Figure 3:
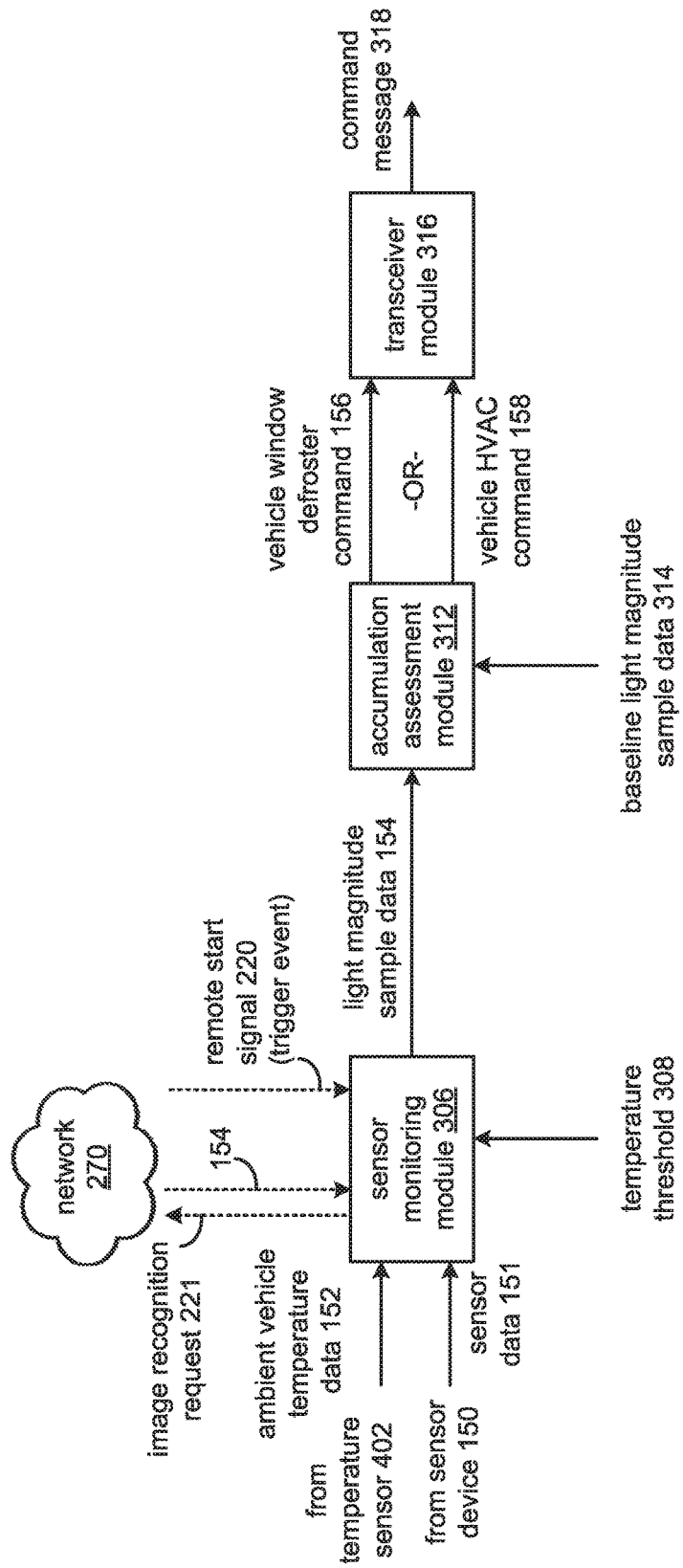
FIG. 3 illustrates a functional module block diagram of a vehicle control unit of FIG. 1.

FIG. 3 illustrates a functional module block diagram of a vehicle control unit 160, in which a sensor monitoring module 306, and accumulation assessment module 312, and a transceiver module 316 may be stored in a memory 206 for the vehicle control unit 160.

The sensor monitoring module 306 may include instructions that, when executed by the processor, cause the processor to receive ambient vehicle temperature data 152 via temperature sensor 402, and compare the ambient vehicle temperature data 152 with a temperature threshold 308 indicative of freezing precipitation. When the ambient vehicle temperature data 152 exceeds the temperature threshold 308 for freezing precipitation (that is, drops to or below the temperature threshold 308), the sensor monitoring module 306 receives sensor data 151 from sensor device 150. The sensor device 150 may operate to sense ambient light from within a vehicle cabin for determining light intensity, and changes of a refractive index of a windshield that may result from freezing-precipitation accumulation.

Sensor device 150 may operate to sense ambient light 130 passing through the windshield 110 into the vehicle cabin 124. The intensity of the ambient light reaching the vehicle cabin 124 relates to a refractive index of the windshield, which correlates with the amount of freezing-precipitation that may accumulate on the windshield 110. Light density may be understood to be a value of is candela per square meter ($cd/m^2$), which includes the origin of the windshield area, or quantity, of the light, and intensity of the light emitted ("l") per area ("A") times cosine of surface angle, ("ε") or $L=l/A*\cos(\varepsilon)$. Examples of sensor device 150 may include a sunload sensor, a camera sensor, etc.

A sunload sensor may operate to sense the intensity of the ambient light to generate sensor data 151. As may be appreciated, a sensor control unit may be coupled with a sensor control unit to convert sensor data 151, when in an analog format, to light sample data 154. The sensor monitoring module 306 may also operate to provide such a conversion from an analog format to a digital format as desired.

A camera sensor may operate to take digital images of a vehicle windshield, which may be retrieved by the sensor monitoring module 306 and, based on image recognition techniques, may generate the light magnitude sample data 154.

As may be appreciated, image recognition may be implemented via convolutional neural networks (CNNs or ConvNets). A CCN operates with respect that any given image, such as that may be provided via the light magnitude sample data 154, proximity is strongly correlated with similarity. That is, pixels that are near one another in a given image are more likely to be related than pixels that are further apart. A CNN operates to provide image processing efficiency through filtering connections by proximity, so that each neuron of a CNN accepts inputs from a small subsection of the image layer (for example, 3×3 pixels, 5×5 pixels, etc.).

The sensor monitoring module 306 may include a CNN submodule to provide image recognition functionality for converting the sensor data 151 to light magnitude sample data 154, as well as may, when cloud computing services may be available via network 270 as indicated by phantom lines, transmit an image recognition call and/or request with the sensor data 151 and receive in response light magnitude sample data 154.

As may also be appreciated, vehicle battery source charge may be reserved for trigger events, such as the sensor monitoring module 306 receiving a remote start signal 220. In this respect, when a vehicle user or user application transmits the remote start signal 220, the vehicle control 160 may operate to access a freezing-precipitation accumulation of a vehicle windshield.

The accumulation assessment module 312 may include instructions that, when executed by the processor, cause the processor to compare the light magnitude sample data 154 with a baseline light magnitude sample data 314 from within the vehicle cabin. The baseline light magnitude sample data 314 may be sampled upon a point in time (such as when the vehicle may be parked), periodically (such as over predetermined intervals), and/or with respect to data samples developed under varying time and/or date conditions under varying cold-season conditions. In this respect, baseline intensities may be sampled to provide comparison samples for light intensity determinations, which may relate to changes and/or variations in a refractive index of a vehicle windshield that may occur from freezing-precipitation accumulation. The baseline light magnitude sample data 314 and the light magnitude sample data 154 may be normalized with respect to an expected ambient light for a respective time-of-day and a respective calendar day.

Because freezing-precipitation accumulation may be assessed for substantially the span of a vehicle window, more information may be accessible as to whether to generate a vehicle window defroster command 156 or a vehicle HVAC command 158. That is, when freezing-precipitation may be non-uniform for a vehicle windshield, resulting in a sufficient viewing space for vehicle operation, a vehicle HVAC command 158 may be appropriate for mitigating the remaining freezing-precipitation. On the other hand, for the light intensity (such as via a sunload sensor) or based on image recognition (such as via a camera device), accumulation assessment (as relating to whether an accumulation affects a refractive index of the windshield) may occur for the windshield area, instead of specific, limited portions that may lead to false readings that are incorrectly applied to the vehicle windshield as a substantial-whole. In this regard, additional information may be secured by the vehicle control unit 160 in determining whether to engage the vehicle window defroster 112a, 112b and/or 112c (FIG. 1), and associated energy charge of the respective heater and/or blower, or whether to engage a vehicle HVAC 122, which functions to provide a comfort level for a vehicle user upon entering the vehicle cabin.

Accordingly, when the light magnitude sample data 154 compares unfavorably with the baseline light magnitude sample data 314, the accumulation assessment module 312 may generate a vehicle window defroster command 156 for transmission via transceiver module 316 as a command message 318 to activate a vehicle window defroster operable to be powered by a vehicle battery source to mitigate a freezing-precipitation accumulation of a vehicle window span. Otherwise, the accumulation assessment module 312 may generate a vehicle HVAC command 158 for transmission via the transceiver module 316 as a command message 318.

Also, ambient light may be subsequently sensed to determine whether to a freezing-precipitation accumulation has been mitigated, based on subsequent magnitude sample data 154. The subsequent magnitude sample data may be compared with the baseline light magnitude sample data 314, and when the subsequent light magnitude sample data compares favorably with the baseline light magnitude sample data 314, generating a vehicle HVAC command 158 for transmission via the transceiver module 316 as a command message 318 to activate a vehicle cabin HVAC operable to be powered by the vehicle battery source.

Figure 4:
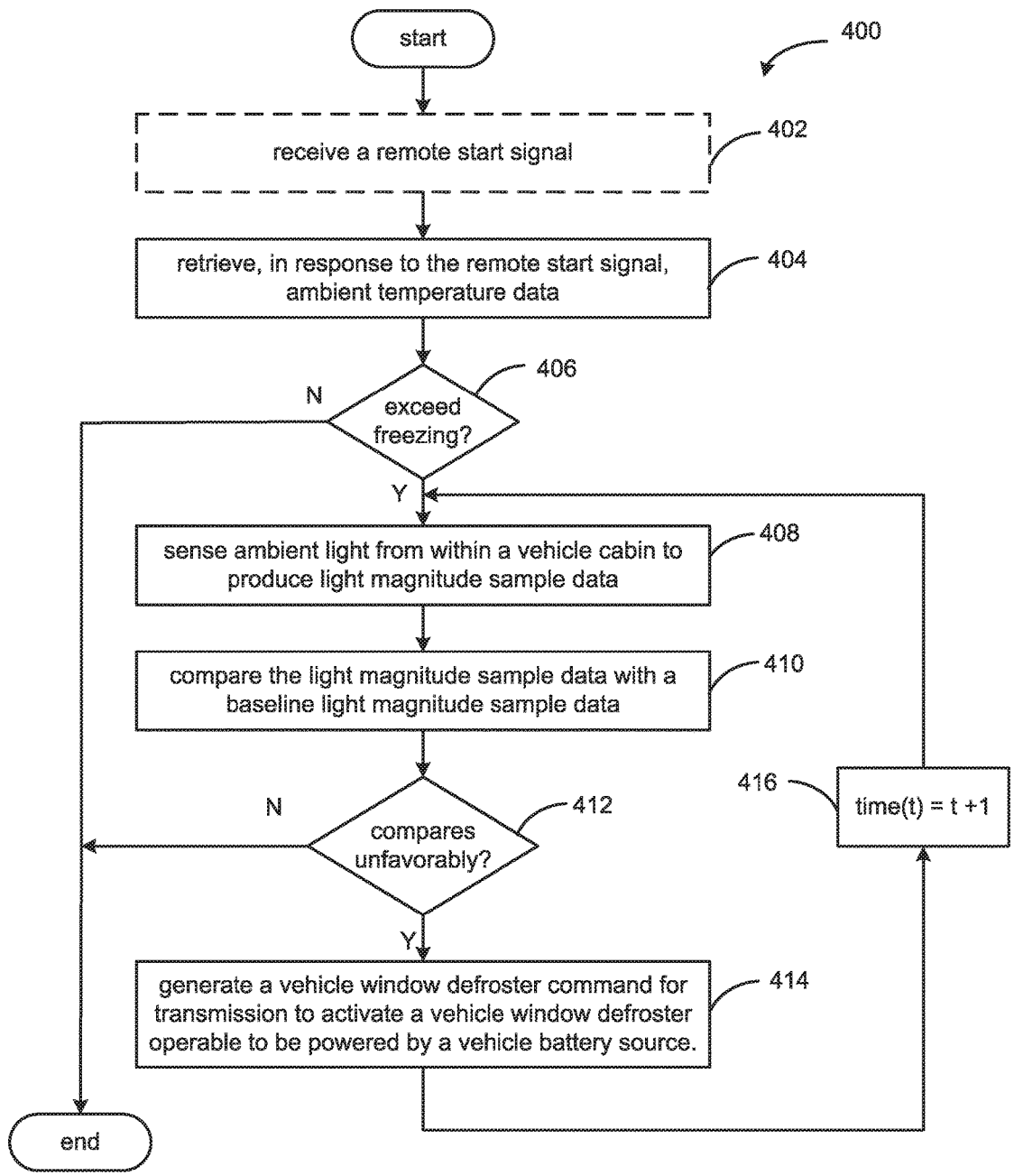
FIG. 4 illustrates an example process for mitigating freezing-precipitation accumulation of a vehicle windshield.

FIG. 4 illustrates an example process 400 for mitigating freezing-precipitation accumulation of a vehicle windshield. As may be appreciated, the process 400 may be stored by a memory 204 of the vehicle control unit 160 for execution by the processor 204 (FIG. 2).

At operation 602, a trigger event, as an option as indicated by phantom lines, may occur to begin the process 400. A trigger event may be receiving a remote start signal, whether prompted by a key fob, a mobile handheld device, or a server communicatively coupled with a network for scheduled starts (such as at the end of a workday), etc. In this respect, a vehicle battery source charge may be reserved for such trigger events. In this respect, when a vehicle user or user application transmits the remote start signal 220, the vehicle control 160 may operate to access a freezing-precipitation accumulation status of a vehicle windshield.

At operation 402, ambient temperature data is retrieved by the process 400, and when the ambient temperature data exceeds a temperature threshold for freezing precipitation at operation 406, ambient light from within a vehicle cabin is sensed to produce light magnitude sample data at operation 408.

As may be appreciated, ambient light from within a vehicle cabin may be sensed for determining light intensity, and for changes of a refractive index of a windshield that may result from freezing-precipitation accumulation. The intensity of the ambient light reaching the vehicle cabin 124 relates to a refractive index of the windshield, which correlates with the amount of freezing-precipitation that may accumulate on the windshield 110. Light density may be understood to be a value of is candela per square meter ($cd/m^2$), which includes the origin of the windshield area, or quantity, of the light, and intensity of the light emitted ("l") per area ("A") times cosine of surface angle, ("ε") or $L=l/A*\cos(\varepsilon)$. Examples of sensor device 150 may include a sunload sensor, a camera sensor, etc.

At operation 410, the light magnitude sample data is compared with a baseline light magnitude sample data from within the vehicle cabin. The baseline light magnitude sample data 314 may be sampled upon a point in time (such as when the vehicle may be parked), periodically (such as over predetermined intervals), and/or with respect to data samples developed under varying time and/or date conditions under varying cold-season conditions. In this respect, baseline intensities may be sampled to provide comparison samples for light intensity determinations, which may relate to changes and/or variations in a refractive index of a vehicle windshield that may occur from freezing-precipitation accumulation. The baseline light magnitude sample data 314 and the light magnitude sample data 154 may be normalized with respect to an expected ambient light for a respective time-of-day and a respective calendar day.

When at operation 412 the light magnitude sample data compares unfavorably with the baseline light magnitude sample data, the process 400 generates a vehicle window defroster command at operation 614 for transmission to activate a vehicle window defroster operable to be powered by a vehicle battery source, or in the alternative, end the process 400.

As may be appreciated, the process 400 may subsequently sense at operation 416 the ambient light from within the vehicle cabin to determine the amount of freezing-precipitation accumulation remaining. When the subsequent ambient light sample data compares favorably with baseline light magnitude sample data, so the process 400 may generate a vehicle HVAC command for providing vehicle user comfort.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled."

As one of ordinary skill in the art will further appreciate, the term "compares favorably," as may be used herein, indicates that a comparison between two or more elements, items, signals, et cetera, provides a desired relationship.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage medium, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for mitigating freezing-precipitation accumulation for a vehicle window, the method comprising:
   retrieving ambient temperature data via a sensor,
   when the ambient temperature data exceeds a temperature threshold for freezing precipitation:
   sensing ambient light via a sensor device operable to sense ambient light from within a vehicle cabin to produce light magnitude sample data,
   wherein the sensing ambient light from within the vehicle cabin to produce light magnitude sample data comprises:
      capturing an image of a vehicle window surface span;
      processing the image to produce image data;
      processing the image data to produce image recognition data; and
      generating the light magnitude sample data from the image recognition data;

comparing the light magnitude sample data with a baseline light magnitude sample data from within the vehicle cabin via a processor in communication with the sensor device operable to sense ambient light, and when the light magnitude sample data does not provide a desired relationship with the baseline light magnitude sample data, generating a vehicle window defroster command for transmission to activate a vehicle window defroster operable to be powered by a vehicle battery source.

2. The method of claim 1, wherein at least one sunload sensor operates for sensing the ambient light from within the vehicle cabin to produce the light magnitude sample data.

3. The method of claim 1, wherein the baseline light magnitude sample data relating to a prior sensing of the ambient light within the vehicle cabin.

4. The method of claim 1, wherein the baseline light magnitude sample data and the light magnitude sample data are each normalized with respect to an expected ambient light for a respective time-of-day.

5. The method of claim 1, further comprising:
subsequently sensing the ambient light from within the vehicle cabin to produce subsequent magnitude sample data;
comparing the subsequent light magnitude sample data with a baseline light magnitude sample data from within the vehicle cabin; and
when the subsequent light magnitude sample data provides the desired relationship with the baseline light magnitude sample data, generating a vehicle HVAC command for transmission to activate a vehicle cabin HVAC operable to be powered by the vehicle battery source.

6. The method of claim 1, wherein the light magnitude sample data correlates to a refractive index of the vehicle window to be affected by the freezing-precipitation accumulation of a vehicle window surface span.

7. A method mitigating freezing-precipitation accumulation for an electric-vehicle window:
receiving a remote start signal;
retrieving, in response to the remote start signal, ambient temperature data via a sensor;
when the ambient temperature data exceeds a temperature threshold for freezing precipitation:
sensing ambient light from within a vehicle cabin via a sensor device operable to sense ambient light to produce light magnitude sample data,
wherein the sensing ambient light from within the vehicle cabin to produce light magnitude sample data comprises:
capturing an image of an electric-vehicle window surface span;
processing the image to produce image data;
processing the image data to produce image recognition data; and
generating the light magnitude sample data from the image recognition data;
comparing the light magnitude sample data with a baseline light magnitude sample data from within the vehicle cabin via a processor in communication with the sensor device operable to sense ambient light, and
when the light magnitude sample data does not provide a desired relationship with the baseline light magnitude sample data, generating an electric-vehicle window defroster command for transmission to activate an electric-vehicle window defroster operable to be powered by a vehicle battery source.

8. The method of claim 7, wherein at least one sun-load sensor operates for sensing the ambient light from within the vehicle cabin to produce the light magnitude sample data.

9. The method of claim 7, wherein the baseline light magnitude sample data relating to a prior sensing of the ambient light within the vehicle cabin.

10. The method of claim 7, wherein the baseline light magnitude sample data and the light magnitude sample data are each normalized with respect to an expected ambient light for a respective time-of-day.

11. The method of claim 7, further comprising:
subsequently sensing the ambient light from within the vehicle cabin to produce subsequent magnitude sample data;
comparing the subsequent light magnitude sample data with a baseline light magnitude sample data from within the vehicle cabin; and
when the subsequent light magnitude sample data provides the desired relationship with the baseline light magnitude sample data, generating a vehicle HVAC command for transmission to activate a vehicle cabin HVAC operable to be powered by a vehicle battery source.

12. The method of claim 7, wherein the light magnitude sample data corresponds with the freezing-precipitation accumulation of an electric-vehicle window surface span.

13. A vehicle control unit comprising:
a communication interface to service communication with a vehicle network;
a processor communicably coupled to the communication interface and a plurality of sensor devices; and
memory communicably coupled to the processor and storing:
a sensor monitoring module including instructions that, when executed by the processor, cause the processor to:
receive ambient vehicle temperature data;
compare the ambient vehicle temperature data with a temperature threshold for freezing precipitation; and
when the ambient vehicle temperature data exceeds the temperature threshold for freezing precipitation, receive light magnitude sample data from a sensor device operable to sense ambient light from within a vehicle cabin, wherein the sensing ambient light from within the vehicle cabin to produce light magnitude sample data comprises:
capturing an image of a vehicle window surface span;
processing the image to produce image data;
processing the image data to produce image recognition data; and
generating the light magnitude sample data from the image recognition data; and
an accumulation assessment module including instructions that, when executed by the processor, cause the processor to:
compare the light magnitude sample data with a baseline light magnitude sample data from within the vehicle cabin; and
when the light magnitude sample data does not provide a desired relationship with the baseline light magnitude sample data, generate a vehicle window defroster command for transmission to activate a vehicle window defroster operable to be powered by a vehicle battery source to mitigate a freezing-precipitation accumulation of a vehicle window span.

14. The vehicle control unit of claim 13, wherein at least one sun-load sensor operates for sensing the ambient light from within the vehicle cabin to produce the light magnitude sample data.

15. The vehicle control unit of claim 13, wherein the baseline light magnitude sample data relating to a prior sensing of the ambient light within the vehicle cabin.

16. The vehicle control unit of claim 13, wherein the baseline light magnitude sample data and the light magnitude sample data are each normalized with respect to an expected ambient light for a respective time-of-day.

17. The vehicle control unit of claim 13, wherein:
the sensor monitoring module including further instructions that, when executed by the processor, cause the processor to:
subsequently sense the ambient light from within the vehicle cabin to produce subsequent magnitude sample data; and
the accumulation assessment module including further instructions that, when executed by the processor, cause the processor to:
compare the subsequent light magnitude sample data with the baseline light magnitude sample data from within the vehicle cabin; and
when the subsequent light magnitude sample data provides the desired relationship with the baseline light magnitude sample data, generating a vehicle HVAC command for transmission to activate a vehicle cabin HVAC operable to be powered by a vehicle battery source.

* * * * *

UNITED STATES PATENT AND TRADEMARK OFFICE
CERTIFICATE OF CORRECTION

PATENT NO. : 10,220,675 B1
APPLICATION NO. : 15/690845
DATED : March 5, 2019
INVENTOR(S) : Frankie B. Reed Page 1 of 1

It is certified that error appears in the above-identified patent and that said Letters Patent is hereby corrected as shown below:

In the Claims

Column 13, Line 15: in Claim 3, replace "magnitude sample data relating" with --magnitude sample data relates--

Column 14, Line 5: in Claim 9, replace "magnitude sample data relating" with --magnitude sample data relates--

Column 15, Line 6: in Claim 15, replace "magnitude sample data relating" with --magnitude sample data relates--

Column 14, Line 1: in Claim 8, replace "sun-load" with --sunload--

Column 15, Line 2: in Claim 14, replace "sun-load" with --sunload--

Column 15, Lines 13-14: in Claim 17, replace "sensor monitoring module including further instructions" with --sensor monitoring module includes further instructions--

Signed and Sealed this
Nineteenth Day of November, 2019

Andrei Iancu
*Director of the United States Patent and Trademark Office*